United States Patent [19]

Lind

[11] Patent Number: 4,517,922
[45] Date of Patent: May 21, 1985

[54] PET AMUSEMENT DEVICE

[76] Inventor: Jeannine H. Lind, Glen Rte., Box 220, Aitkin, Minn. 56431

[21] Appl. No.: 422,833

[22] Filed: Sep. 24, 1982

[51] Int. Cl.³ .............................................. A01K 15/00
[52] U.S. Cl. ...................................................... 119/29
[58] Field of Search ................. 119/29, 29.5; D30/99, D30/42

[56] References Cited

U.S. PATENT DOCUMENTS

| D. 257,293 | 10/1980 | Michalski | D30/42 |
|---|---|---|---|
| 2,698,598 | 1/1955 | Hadley | 119/29 |
| 3,097,626 | 7/1963 | Felten | 119/29 |
| 3,295,499 | 1/1967 | Manchester | 119/29 |
| 3,721,414 | 3/1973 | Yoder | 248/175 |
| 4,177,761 | 12/1979 | Bellocchi | 119/29 |
| 4,177,763 | 12/1979 | Cook | 119/29 |

Primary Examiner—Robert P. Swiatek
Assistant Examiner—Kris R. Schulze
Attorney, Agent, or Firm—Kinney & Lange

[57] ABSTRACT

A device for the amusement of pets (and in particular cats) includes a flat horizontal base and a post secured to the base adjacent its periphery which extends upwardly therefrom so that an upper end of the post is positioned over and above a central portion of the base. A coiled spring is secured to the upper end of the post and extends upwardly therefrom so that a free outer end of the coiled spring is positioned over and above the central portion of the base. A pet toy aromatized with catnip is attached to the bottom end of a cord, the top end of which is selectively secured to the free outer end of the coiled spring by a suitable fastener. The pet toy is thus resiliently suspended over the base. In addition, the pet toy, post and base all have durable coverings penetrable by pet claws.

6 Claims, 3 Drawing Figures

PET AMUSEMENT DEVICE

BACKGROUND OF THE INVENTION

1. Field of the Invention

This invention relates to pet amusement devices, and particularly to an amusement device having an aromatized pet toy resiliently suspended for the amusement of felines.

2. Description of the Prior Art

It is well known that pets, and felines in particular, can be playfully amused for quite some time with the appropriate toy. A ball of yarn or a scrap of cloth has often entertained a cat for hours on end. Because cats have claws, they particularly enjoy playing with toys in which their claws can penetrate to firmly grasp the toy during play. In addition, for reasons unknown, cats are fond of scratching or clawing at drapery, carpeting or furniture within a home. Thus, clawing posts or pads have been designed to satisfy these feline clawing urges. Generally, such devices comprise carpet-covered bases or posts upon which the cat can climb and claw.

It is also well known that many animals possess a keen sense of smell and can be effectively lured by the use of scents. Certain scents are sexually stimulating to certain animals, will arouse the curiosity of such animals and will attract such animals from the standpoint of smell and/or taste. Two patents discussing the use and effectiveness of scented animal lure compositions for attracting wild game are U.S. Pat. No. 3,046,192, granted to Bilyeu on July 24, 1962 and U.S. Pat. No. 3,119,650, granted to Bilyeu on Jan. 28, 1964. Cats in particular are extremely fond of the odor of catnip, which is a plant of the mint family with strongly scented leaves. For this reason, cat toys and amusement devices are often aromatized with the odor of catnip to enhance the cat's interest in the toy or device.

SUMMARY OF THE INVENTION

The present invention relates to a device for the amusement of pets, and in particular pets of the feline variety. The pet amusement device of the present invention comprises a generally flat, generally horizontal base and a post secured to the base adjacent its periphery. The post extends upwardly from the base in such a manner that an upper end of the post is positioned over and above a central portion of the base. An elongated resilient member is secured to the upper end of the post and extends when in an unstressed condition outwardly and upwardly therefrom so that a free outer end of the resilient member is positioned over and above the central portion of the base. A pet toy with a chord attached thereto is selectively secured to the free outer end of the resilient member by suitable fastening means so that the pet toy is suspended from the outer end of the resilient member and over the base.

The pet toy has a vapor permeable covering and contains a scented animal lure composition to attract pets to the amusement device. For cats in particular, the lure composition includes catnip. To further enhance the attractiveness of the pet amusement device to felines, exposed surfaces of the base and post are substantially covered with a durable material penetrable by pet claws, such as carpeting or upholstery material. The pet toy also has a durable covering penetrable by pet claws.

In a preferred embodiment, the resilient member comprises an elongated coiled spring, which is tightly coiled to prevent the cord from becoming caught therein. The post extends upward at a first acute angle relative to the base and the elongated resilient member extends upward and outward at a second more acute angle relative to the base. The resilient member has a bend therein causing an outer section of the resilient member to extend outward and upward at a third, more acute angle relative to the base.

DETAILED DESCRIPTION OF THE PREFERRED EMBODIMENT

Figure 1:
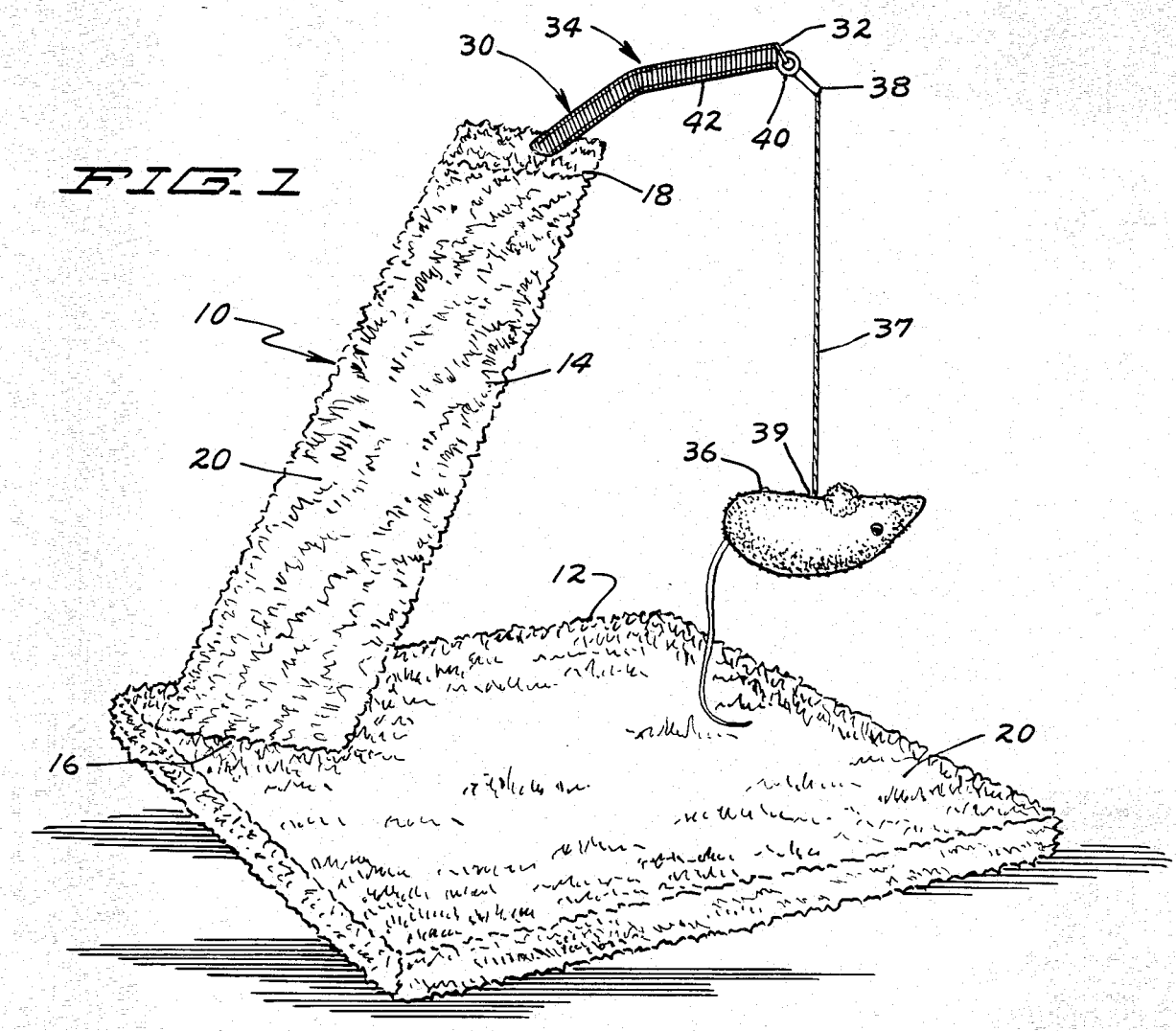
FIG. 1 is a perspective view of a pet amusement device made according to the present invention.
Figure 2:
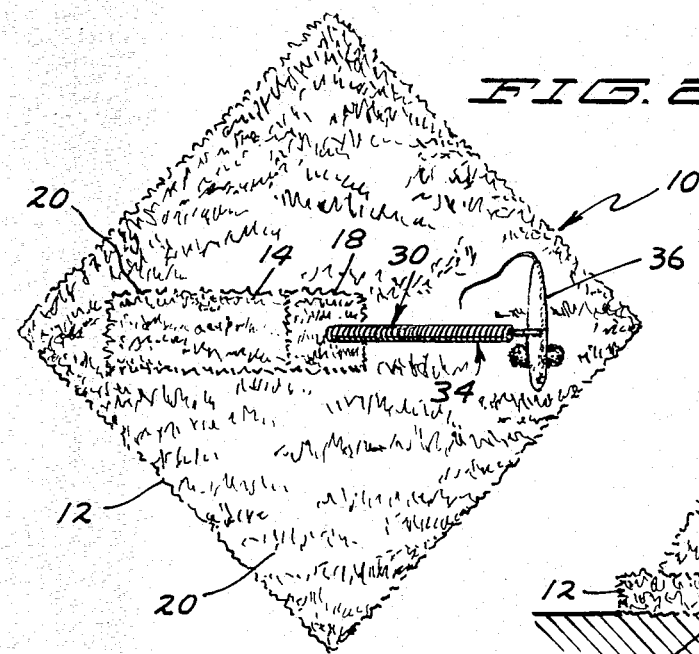
FIG. 2 is a top plan view of the pet amusement device of FIG. 1.
Figure 3:
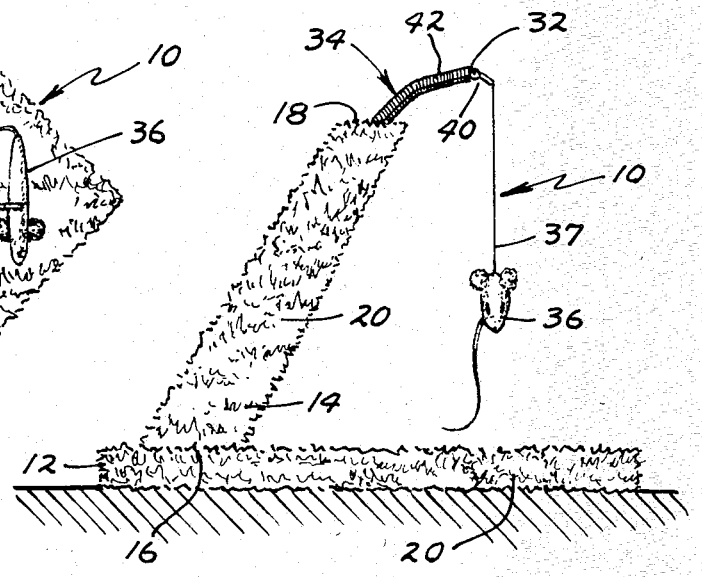
FIG. 3 is a side elevational view of the pet amusement device of FIGS. 1 and 2.

FIGS. 1 through 3 show a pet amusement device 10 of the present invention which includes a generally flat, generally horizontal base 12 and an elongated post 14. Although the base 12 as shown is substantially rectangular in configuration, other shapes are also possible as long as the base 12 functions to maintain the amusement device 10 generally upright. In addition, the shape of the post should not be considered limited to that shown in the figures, but can be of any suitable elongated configuration.

The post 14 has a lower end 16 and an upper end 18. The lower end 16 of the post 14 is secured to the base 12 by suitable fastening means (not shown) adjacent the periphery of the base 12. The post 14 extends upwardly from the base 12 in such a manner that the upper end 18 of the post 14 is positioned over and above a central portion of the base 12, as shown.

As shown, an elongated resilient member 30 is fixedly secured to the upper end 18 of the post 14 by suitable fasteners (not shown). The elongated resilient member 30 extends when in an unstressed condition upwardly and outwardly from the post 14 in such a manner that a free outer end 32 of the resilient member 30 is positioned generally over and above the central portion of the base 12. Preferably, the resilient member 30 comprises an elongated coiled spring 34 with generally contiguous coils, like a standard screen door spring.

A pet toy 36 has a cord 37 attached thereto as shown. A top end 38 of the cord 37 is selectively secured to the free outer end 32 of the coiled spring 34 by suitable fastening means, such as an eyelet 40 secured around an end coil of the coiled spring 34, as best seen in FIG. 1. A bottom end 39 of the cord 37 is secured to the pet toy 36 by suitable fastening means (not shown). When thus assembled, the pet toy 36 is suspended from the free outer end 32 of the coiled spring 34 by the cord 37 over the base 12. The tight contiguous coils of the coiled spring 34 prevent the cord 37 from becoming caught therebetween during play by a cat, for example.

As best seen in FIG. 3, the post 14 extends upwardly from the base 12 at a first acute angle relative to the base 12. The elongated coiled spring 34 initially extends when in an unstressed condition upwardly and outwardly from the upper end 18 of the post 14 at a second, more acute angle relative to the base 12. The coiled spring 34 preferably has a bend at an intermediate portion thereof causing an outer section 42 of the spring 34 to extend when in an unstressed condition outwardly and upwardly at a third, more acute angle relative to the base 12. This supporting relationship has been found to be the optimum for suspension of the pet toy 36 over the base 12 and to prevent entanglement of the pet toy 36 and the cord 37 with the post 14 and coiled spring 34.

To enhance the attractiveness of the pet amusement device 10 to pets, the pet toy 36 is preferably provided with a vapor permeable covering and contains an animal lure composition. The lure composition is specifically scented to either sexually stimulate the pet, arouse its curiosity or attract the pet to the amusement device from the standpoint of smell and/or taste. For pets of the feline variety, either the animal lure composition comprises catnip, or the pet toy 36 is aromatized to bear the odor of catnip.

The animal lure composition acts to lure a pet to the pet amusement device 10, and in particular, to the pet toy 36 dangling from the coiled spring 34. The pet's desire to find the source of the scent leads it to touch, muzzle or play with the pet toy 36, causing it to move relative to the base 12.

The dangling and bouncing action of the pet toy 36 that occurs when play is initiated by the pet will entice the pet to further play. Pulling the pet toy 36 downwardly stresses the coiled spring 34 so that when the pet toy 36 is released, the spring 34 will snap it upwardly away from the grasp of the pet. Continued oscillations of the pet toy 36 by the spring 34 will further tempt the pet to continue play. A similar playing action is caused by pulling the pet toy 36 in any direction away from the coiled spring 34. When stressed, the spring 34 will urge the pet toy 36 to return to its "at rest" position hanging generally over the central portion of the base 12. Since the pet toy 36 dangles (at rest) over the central portion of the base 12, the weight of the pet on the flat horizontal base 12 prevents the pet amusement device 10 from tipping over during vigorous play.

Preferably, all exposed surfaces of the base 12 and post 14 are substantially covered with a durable material which is penetrable by a pet's claws. Many materials are suitable for such a covering. Because of the requirement of durability under constant clawing, however, the most suitable material has been found to be cut pile or shag carpeting. By covering the major structural portion of the pet amusement device 10 with carpeting 20 (as shown), the clawing attractiveness is enhanced because the pet's claws will become entangled in the covering thereby enticing the pet to play. The carpet covering enhances the visual attractiveness of the device 10 and also increases the useful attractive life of the device 10 by preventing damage to the post 14 and base 12 underneath.

Felines in particular enjoy exercising their clawing ability, and are thus attracted to the pet amusement device 10 of the present invention by the carpet 20 on the base 12 and post 14. The pet toy 36 is also provided with a covering penetrable by pet or cat claws, such as cloth or upholstery material. In addition, this covering is reasonably durable to stand up to vigorous clawing activity. Thus, the catnip aroma combined with the spring action pet toy and the carpet covering provide an extremely attractive amusement device for a cat.

The pet toy 36 can assume any desired shape, such as the "mouse" form (as shown) or, for example, a ball shaped form (not shown). Each pet toy has its own cord and the pet toys may be interchanged on the device 10 simply by removing the cord of one pet toy from the free outer end 32 of the coiled spring 34 and replacing it with the cord of another.

Although the present invention has been described with reference to preferred embodiments, workers skilled in the art will recognize that changes may be made in form and detail without departing from the spirit and scope of the invention.

What is claimed is:

1. A pet amusement device which comprises:
    a generally flat, generally horizontal base:
    a single post secured to the base adjacent its periphery, said post extending upwardly at an acute angle relative to the base in such a manner that an upper end of the post is positioned over and above a central portion of the base, and the base having no other posts extending upwardly therefrom;
    an elongated member having a resiliency greater than that of said post secured to the upper end of the post and extending when in an unstressed condition outwardly and upwardly therefrom in such a manner that a free outer end of the elongated member is positioned over and above the central portion of the base;
    a pet toy constituted as a soft skinned, mouse-sized object impregnated with a scented animal lure;
    a cord attached to the pet toy; and
    fastening means for selectively securing the cord to the free outer end of the elongated member in such a manner that the pet toy is suspended from the elongated member generally over the central portion of the base so that to play with the pet toy a pet is induced to place its weight on the base which thereby prevents the pet amusement device from tipping over during vigorous play.

2. The pet amusement device of claim 1 wherein the elongated member comprises an elongated coiled spring.

3. The pet amusement device of claim 2 wherein the coiled spring is tightly coiled and the coils are contiguous to prevent the cord from becoming caught therebetween.

4. The pet amusement device of claim 1 wherein the elongated member extends when in an unstressed condition upward and outward at a second, more acute angle relative to the base.

5. The pet amusement device of claim 4 wherein the elongated member has a bend therein causing an outer section of the elongated member to extend when in an unstressed condition outward and upward at a third, more acute angle relative to the base.

6. The pet amusement device of claim 1 wherein the pet toy has a durable covering penetrable by pet claws.

* * * * *